(12) United States Patent
Totten et al.

(10) Patent No.: US 8,430,732 B1
(45) Date of Patent: Apr. 30, 2013

(54) V-WEDGE CROP DEFLECTORS

(75) Inventors: Nathaniel K. Totten, Lititz, PA (US);
Melanie W. Harkcom, New Holland, PA (US)

(73) Assignee: CNH America LLC, New Holland, PA (US)

( * ) Notice: Subject to any disclaimer, the term of this patent is extended or adjusted under 35 U.S.C. 154(b) by 5 days.

(21) Appl. No.: 13/279,266

(22) Filed: Oct. 22, 2011

(51) Int. Cl.
*A01F 12/30* (2006.01)
(52) U.S. Cl.
USPC .......................... 460/111; 56/16.4 R; 56/189
(58) Field of Classification Search .................. 460/111;
56/6, 13.6, 16.4 R, 192, 255, 256, 320.1,
56/320.2, DIG. 9, DIG. 20, DIG. 24
See application file for complete search history.

(56) References Cited

U.S. PATENT DOCUMENTS

| | | | |
|---|---|---|---|
| 2,969,862 A | 1/1961 | Worrell | |
| 3,221,484 A | 12/1965 | Van Der Lely | |
| 3,543,491 A | 12/1970 | Lausch | |
| 4,149,543 A | 4/1979 | Decoene et al. | |
| 6,238,286 B1 | 5/2001 | Aubry et al. | |
| 6,602,131 B2 | 8/2003 | Wolters | |
| 6,663,485 B2 | 12/2003 | Niermann | |
| 7,220,179 B2 | 5/2007 | Redekop et al. | |
| 7,261,633 B2 | 8/2007 | Benes | |
| 7,927,200 B2 | 4/2011 | Van Overschelde et al. | |

FOREIGN PATENT DOCUMENTS

DE 2234567 A1 1/1974

*Primary Examiner* — Thomas B Will
*Assistant Examiner* — Mai Nguyen
(74) *Attorney, Agent, or Firm* — Patrick M. Sheldrake

(57) ABSTRACT

A crop guide comprising one or more generally wedge-shaped guides configured to interact with a crop discharge stream as it is discharged from an agricultural mower having a counter-rotating disc cutterbar. The guides are positioned rearward from the cutterbar, with one guide being generally positioned on an axis centered between each pair of converging-rotation disc cutterheads where crop material flow is concentrated. Each guide is generally pyramidal in shape, having a pair of surfaces angled with respect to one another and forming a triangular pyramid form with respect to a third generally planar surface, typically the mower swathboard. The vertex of the pyramid is oriented upstream in the crop flow so that a portion of the crop flow is split by the angled surfaces and laterally dispersed. This dispersion of crop material produces a crop mat on the ground behind the mower having a more uniform thickness compared to that produced by a traditional mower using a counter-rotating rotary cutterbar.

18 Claims, 5 Drawing Sheets

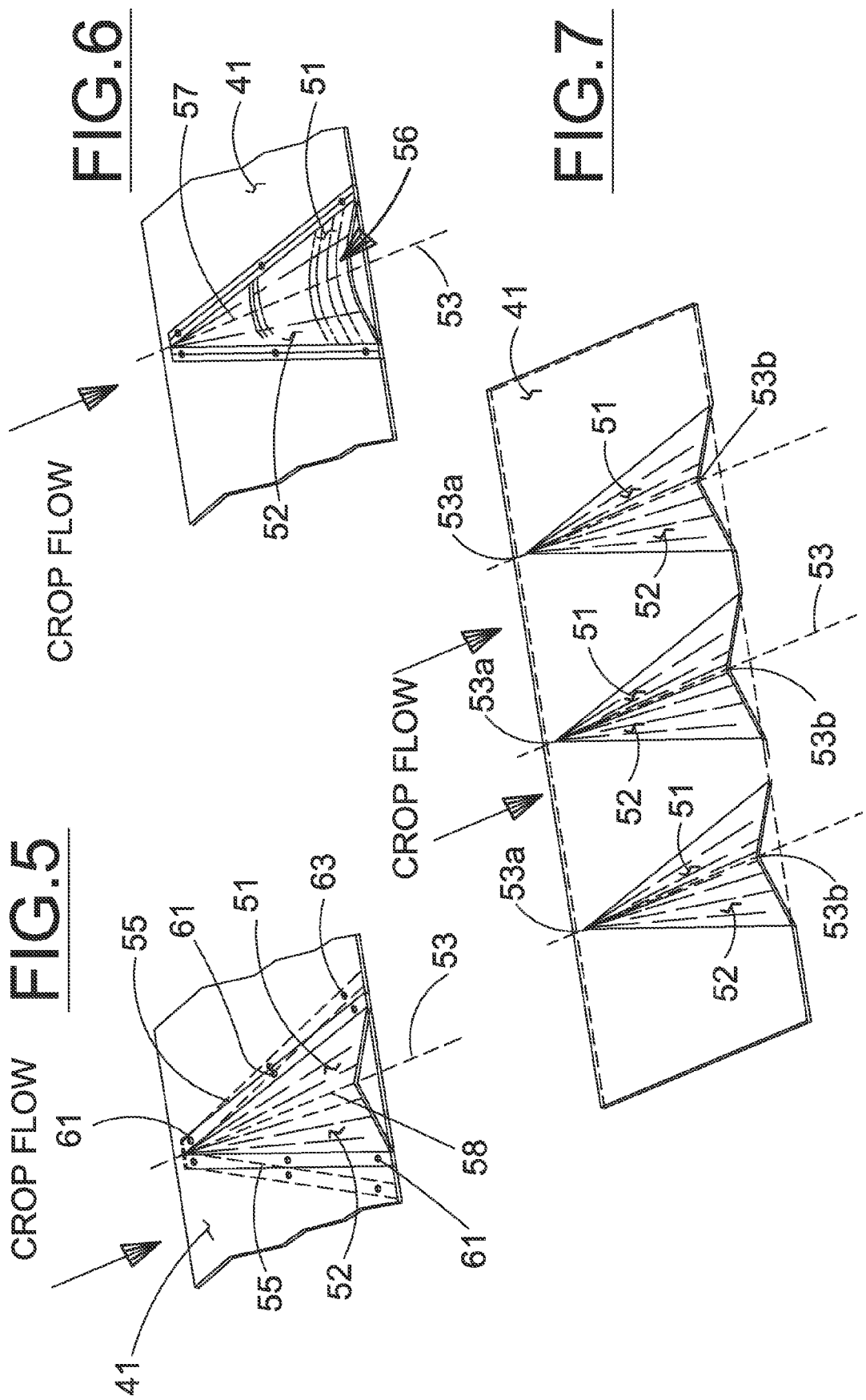

US 8,430,732 B1

V-WEDGE CROP DEFLECTORS

BACKGROUND OF THE INVENTION

This invention relates generally to harvesting machines, such as mowers of the type having a rotary-disc cutterbar using counter-rotating discs, and, more particularly, to a crop deflector configured to uniformly distribute cut crop material behind the machine.

Crop mowers using counter-rotating disc cutter bars tend to cause the flow of cut crop material discharged from the mower to be concentrated in streams of crop generally centered behind pairs of converging-rotation discs. Such concentrations of crop flow are less problematic when the cut crop material is being gathered into windrows on the ground. However, in some instances it is desirable to uniformly disperse crop material behind the mower to enhance drying rather than to gather the crop material into a windrow. This approach is especially beneficial when harvesting green crops with higher moisture content, typically around 80%.

It would be desirable to provide a crop guide working in conjunction with the swathgate or other discharge shields in an agricultural rotary-disc mower that acts upon the crop discharge stream to disperse the crop material more uniformly behind the mower that would overcome the above problems and limitations. The benefits are magnified by a crop guide that produces a discharged crop mat of generally uniform depth that generally spans the width of the mower discharge. Further benefits would be realized by a crop guide that is easily incorporated into production rotary-disc cutterbar mowers without significant alteration of the mower design.

SUMMARY OF THE INVENTION

Accordingly, the present invention, in any of the embodiments described herein, may provide one or more of the following advantages:

It is an object of the present invention to provide one or more crop guides for application on an agricultural counter-rotating rotary-disc cutterbar mower, each guide being centered in the crop discharge stream behind a pair of converging-rotation rotary-disc cutters to laterally deflect a portion of the discharge flow stream to produce a more uniform crop mat thickness behind the mower.

It is another object of the present invention to provide one or more generally wedge-shaped crop guides for application on an agricultural rotary-disc cutterbar mower, wherein each guide is mounted on the mower swathgate.

It is a further object of the present invention to provide one or more generally wedge-shaped crop guides for application on an agricultural rotary-disc cutterbar mower, wherein each guide is integrally formed in the mower swathgate.

It is a further object of the present invention to provide one or more generally wedge-shaped guides on a mower having a counter-rotating rotary disc cutterbar wherein each wedge-shaped guide features a well-defined vertex generally centered between pairs of converging-rotation cutterheads and generally aligned with the direction of crop flow.

It is a still further object of the present invention to provide one or more generally wedge-shaped guides on a mower having a counter-rotating rotary disc cutterbar wherein each wedge-shaped guide features a rounded vertex generally centered between pairs of converging-rotation cutterheads and generally aligned with the direction of crop flow.

It is a still further object of the present invention to provide one or more generally wedge-shaped guides on a mower to disperse the crop flow discharged from the mower wherein the height, width, depth, and/or angle may be varied to produce optimal crop uniformity for each unique mower configuration to which the invention is applied.

It is a still further object of the present invention to provide one or more generally wedge-shaped crop guides on a rotary-disc cutterbar agricultural mower that is durable in construction, inexpensive of manufacture, carefree of maintenance, easily assembled, and simple and effective to use.

These and other objects are achieved according to the instant invention by providing one or more generally wedge-shaped guides configured to interact with a crop discharge stream as it is discharged from an agricultural mower having a counter-rotating disc cutterbar. The guides are positioned rearward from the cutterbar, with one guide being generally positioned on an axis centered between each pair of converging-rotation disc cutterheads where crop material flow is concentrated. Each guide is generally pyramidal in shape, having a pair of surfaces angled with respect to one another and forming a triangular pyramid form with a third generally planar surface, typically a swathboard. The vertex of the pyramid is oriented upstream in the crop flow so that a portion of the crop flow is split by the angled surfaces and laterally dispersed. This dispersion of crop material produces a crop mat on the ground behind the mower having a more uniform thickness compared to that produced by a traditional mower using a counter-rotating rotary cutterbar.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a partial perspective view of a first embodiment of a crop deflector of the present invention viewed from underneath the swathboard;

FIG. 6 is a perspective view of a second embodiment of a crop deflector incorporating the present invention viewed from underneath the swathboard; and FIG. 7 is a perspective view of a third embodiment of a crop deflector incorporating the present invention viewed from underneath the swathboard.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
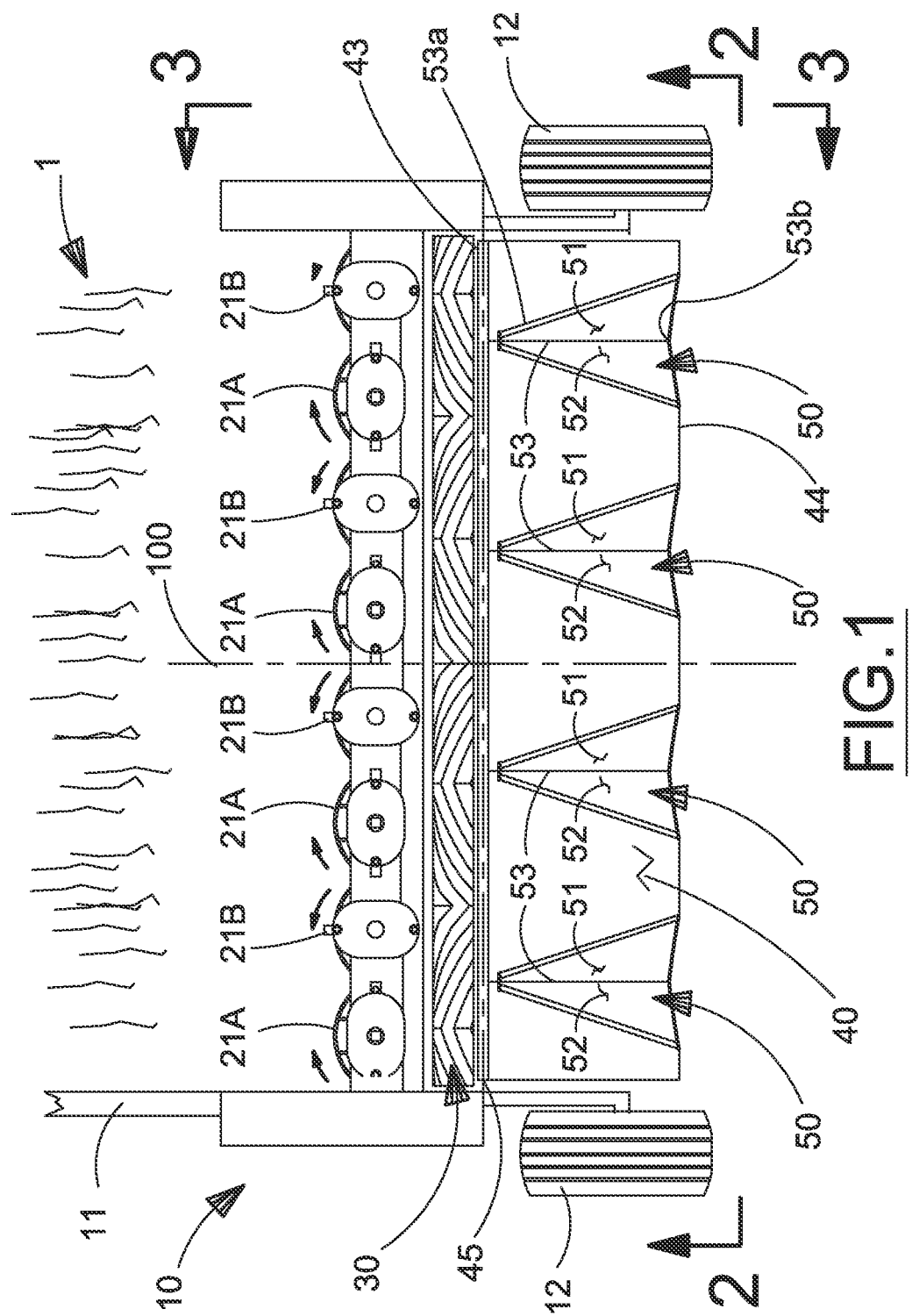
FIG. 1 is a partial plan view of a typical pull-behind agricultural mower having a cutting and conditioning mechanism of the type on which the present invention is useful depicting a first embodiment of the present invention.
Figure 2:
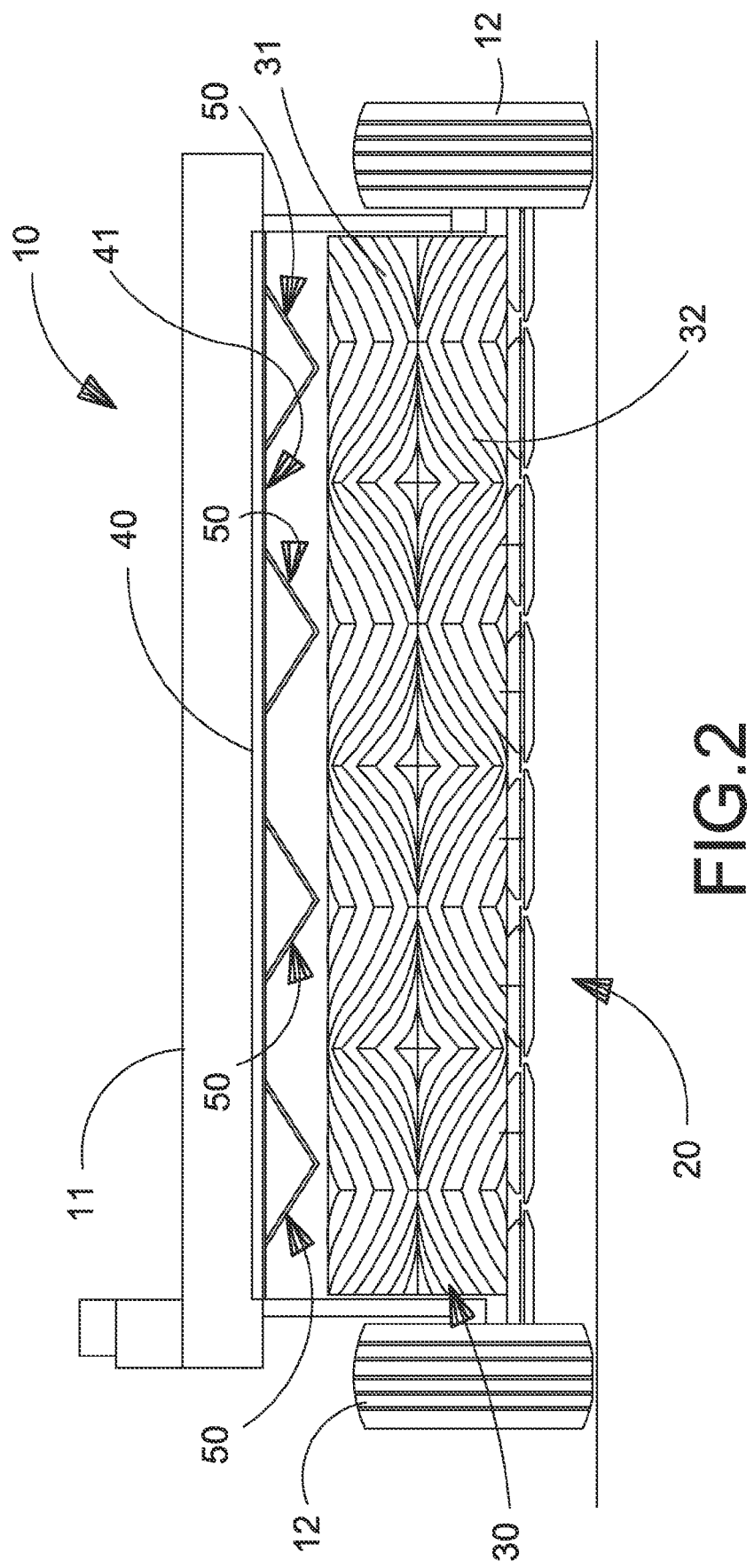
FIG. 2 is a rear elevation view of the agricultural mower shown in FIG. 1.
Figure 3:
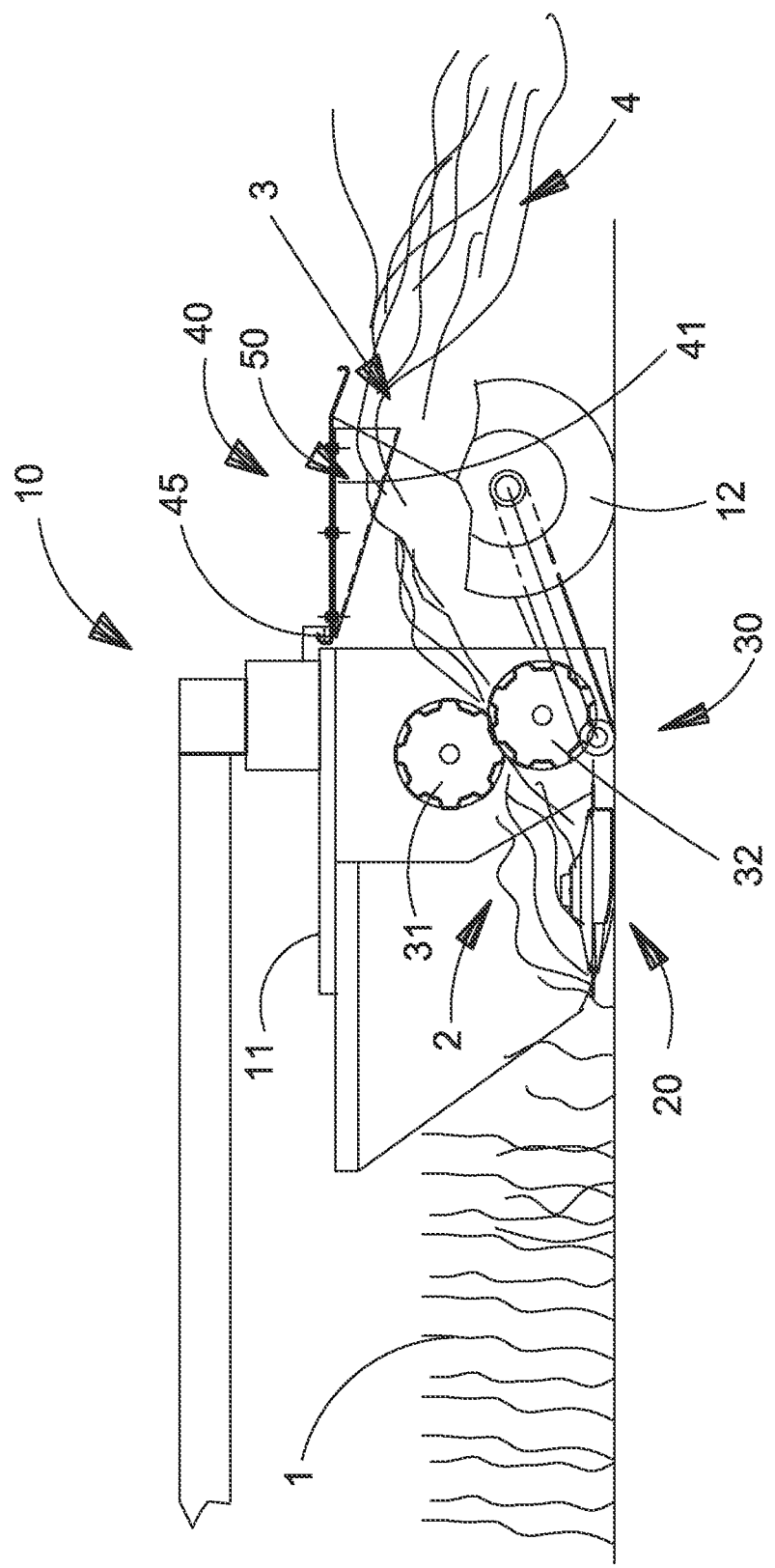
FIG. 3 is a partial side elevation view of the agricultural mower shown in FIG. 1.
Figure 4:
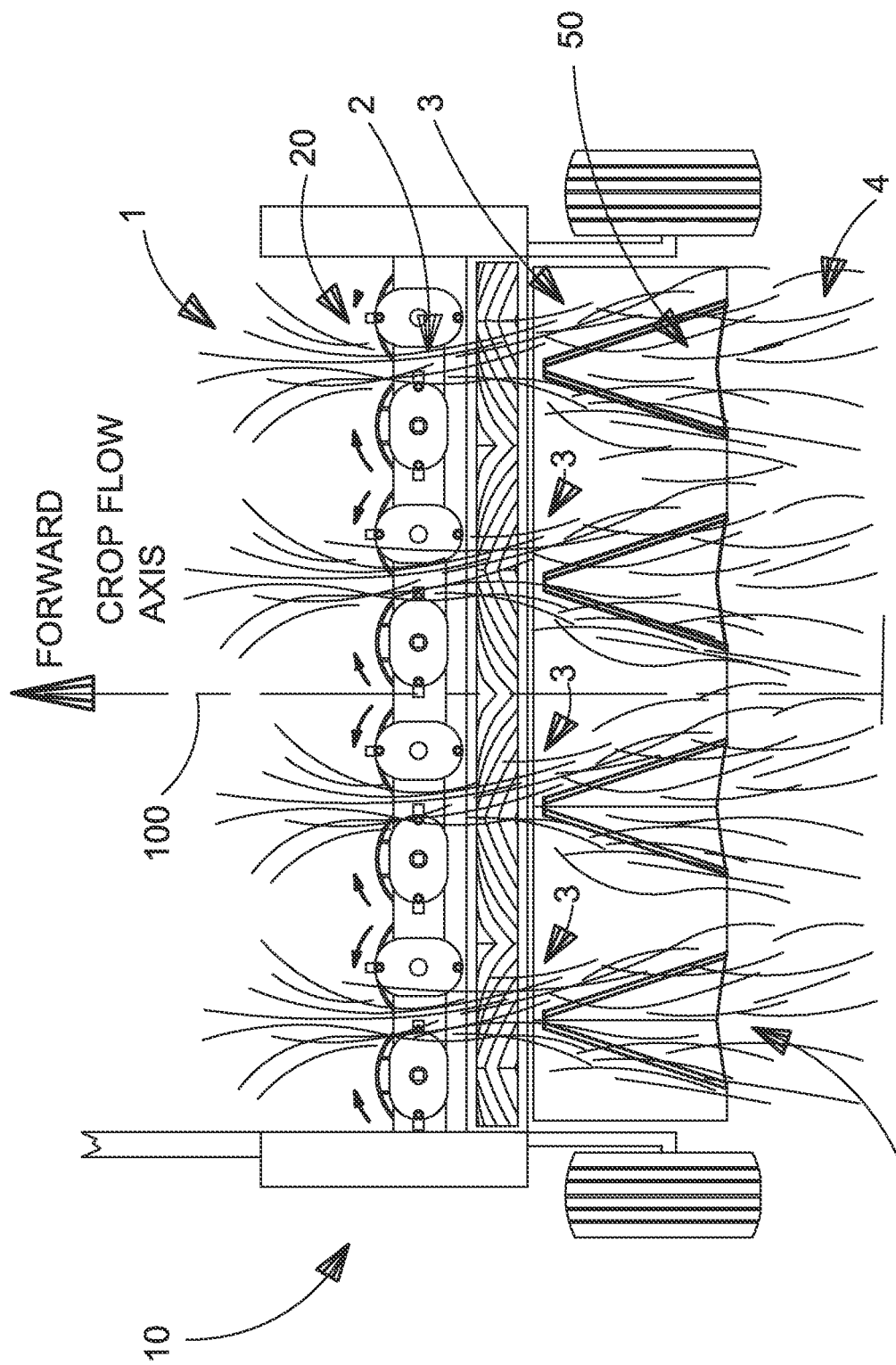
FIG. 4 is a partial plan view of the agricultural mower of FIG. 1 illustration the flow of crop through the mower.

FIGS. 1 through 4 show a partial plan view and two elevation views of a conventional pull-behind agricultural mower-conditioner 10 used for cutting and conditioning a standing crop 1 as it travels forwardly across the ground along a main axis 100. The mower-conditioner 10 is supported by a frame 11 which is operably connected to a tractor (not shown) and supported by a pair of trailing wheels 12. The frame 11 is configured to raise and lower the mower-conditioner relative to the ground surface to support mowing and transport operations. The crop 1 is severed from the ground by a transversely disposed cutting apparatus 20 whereupon it is directed toward and engaged by a conditioning mechanism 30. The cutting apparatus 20 comprises a plurality of rotary disc cutter modules 21A, 21B arranged so that adjacent pairs of modules counter-rotate. Adjacent pairs (21A/21B) rotate so that the cutters converge crop material therebetween while other adjacent pairs (21B/21A) divergingly rotate so that cut crop is directed away from the space between the cutters 21. Consequently, the crop material being directed toward the conditioning mechanism 30 is concentrated into a number of crop streams 2 generally centered between pairs of convergingly rotating disc cutters and less dense in the area downstream of divergingly rotating disc cutters, best illustrated in FIG. 4.

The conditioning mechanism 30 may comprise a pair of transversely elongate conditioning rolls 31, 32 as shown, or it may comprise a flail-type conditioner in which crop passes between a single roll with radially arranged flails and a closely proximate adjacent surface in order to crush the crop material. Conditioning rolls 31, 32 are closely spaced apart on parallel, transverse axes such that a gap is created therebetween through which crop material passes. The crop material is then ejected rearwardly from the conditioner rolls 31, 32 in a plurality of airborne streams 3 along a trajectory generally parallel to main axis 100 whereupon it falls to the ground in a mat 4. A swathgate or swathboard 40 is typically provided to allow alteration of the crop trajectory and thereby control the configuration of the resultant mat of crop material on the ground behind the mower. Movement of the crop material through the conditioning mechanism typically does little to laterally redistribute the individual streams 3 of crop material, thus the mat of crop material deposited on the ground would be of non-uniform density without additional crop movement guides.

Swathboard 40 comprises a generally planar crop guide surface 41 oriented slightly above the trajectory of crop material ejected from conditioner rolls 21, 22. Swathboard 40 may be movably connected to the mower 10 so that guide surface 41 may be angularly positioned to interact to varying degrees with the streams of crop material and thereby influence the trajectory of the crop material streams discharged from the conditioner apparatus. Mowers using fixed-position swathboards are also known and benefit from the present invention. In one embodiment, swathboard 40 is pivotally coupled near its leading edge 43 to the mower along an axis 45 transversely aligned on the mower. The transverse pivot axis 45 allows the swathboard 40 to be angularly adjusted to deflect the flow of crop material being discharged from the conditioner rolls 21, 22 for optimal placement behind the mower-conditioner. Most swathboards are manually angularly adjusted to the desired crop trajectory based upon the crop being harvested and the spatial relationship between the conditioner rolls and the ground for the nominal header operating height on level ground. Once set, the swathgate is typically not moved while the machine is operating.

The present invention includes a plurality of generally pyramidal-shaped crop deflectors 50 positioned on the guide surface 41 of the swathboard 40 adjacent to the crop flow. Each crop deflector comprises a first surface 51 and a second surface 52 that are angled in relation to each other, to the guide surface 41, and to the longitudinal axis 100 along which crop material streams 3 generally flow. First and second surfaces 51, 52 intersect to define a parting axis 53 which is also angled with respect to the guide surface 41 so that the leading end 53a of parting axis 53 intersects the plane of the guide surface 41 and the trailing end 53b of the parting axis is spaced-apart from the plane of guide surface 41 in the direction of the stream of crop material. Each crop deflector 50 extends from the plane of the guide surface and projects in the direction of the streams of crop material being discharged from the conditioner mechanism during operation. The degree of projection of the crop deflector 50 into the crop stream and the angled first 51 and second surfaces 52 is sufficient to cause a portion of the stream of crop material to be laterally deflected at each parting axis 53 in its trajectory to reduce the crop concentration in the streams 2 and produce a more uniform density crop mat 4 on the ground trailing the mower. A portion of the stream 3 will be deflected in a first direction by the first surface 51 and another portion will be deflected in a second direction by the second surface 52. The lateral components of the first and second directions of crop deflection will be generally opposite, though it is noted that the crop deflector is not intended to cause full lateral crop movement. The capability to produce a crop mat of uniform thickness or density is particularly useful when harvesting green crop material when optimal crop drying is desired.

Three alternative embodiments of the crop deflector 50 are illustrated in FIGS. 5 through 7. In a first embodiment shown in FIG. 5, the crop deflector is fabricated from a separate piece of sheet material, bent along parting axis 53 to define apex 58 separating first surface 51 from second surface 52, and subsequently fastened to the swathboard 40. Flanges 55 are provided at the outboard ends of first surface 51 and second surface 52. A plurality of aligned holes in the flanges 55 and the swathboard 40 allow fasteners 61, such as bolts, rivets, or the like, to be used to connect each crop deflector to the swathboard 40. Removable fasteners such as bolts enable the crop guides 50 to be easily removed from the swathboard when crop distribution is not desired. Additional holes 63 provided in the swathboard 40 allow the crop guides to be adjusted slightly to suit different crop conditions.

In FIG. 6, the parting axis 53 of crop deflector 50 is modified to replace a well-defined apex 58 at the intersection of first and second surfaces 51, 52 with a rounded transition 57 between the surfaces 51, 52. Eliminating the well-defined apex 58 on crop guide 50 produces a smoother transition surface for the crop material passing across the deflector 50 thereby reducing the resistance to crop flow created by the guide 50. The rounded transition also reduces forming stresses which increases fatigue resistance for the guide 50.

FIG. 7 shows a plurality of crop deflectors 50 that have been integrally formed from the sheet material of the swathboard 40. The profile of this embodiment may feature the angled well-defined apex 58, as illustrated in FIG. 5 or the rounded transition 57 shown in FIG. 6. This embodiment reduces material costs, but eliminates the option for post-manufacturing adjustment of the crop dispersing swathboard.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A guide for spreading a flow of crop material discharged along an airborne trajectory from an agricultural mower, the mower having a cutterbar with a plurality of laterally spaced-apart rotary cutterheads, each adjacent pair of cutterheads counter-rotationally driven creating a plurality of crop concentration zones within the crop flow, said guide comprising:

a generally planar swathboard positioned generally above the airborne trajectory to deflect the trajectory of the crop material by contact with a lower surface;

a first generally planar surface angularly extending from said lower surface and positioned to contact a first portion of a first crop concentration zone; and a second generally planar surface angularly extending from said lower surface and positioned to contact a second portion of said first crop concentration zone, said second surface being angled relative to said first surface and intersecting said first surface along a parting axis, said parting axis extending generally in the direction of the crop trajectory from a first point on said lower surface downstream toward a second point spaced apart from said lower surface in the direction of the crop flow, said first surface causing said first portion to be deflected partially laterally from the direction of crop flow in a first direction and said second surface causing said second portion to be deflected partially laterally from the direction of crop flow in a second direction generally opposite to said first direction.

2. The crop guide of claim 1, wherein said first and second surfaces are removably connectable to said swathboard.

3. The crop guide of claim 2, wherein said swathboard further comprises a plurality of connections for said crop guide thereby enabling the angle between said first surface and said second surface to be varied.

4. The crop guide of claim 1, wherein said first and said second surfaces are integrally formed from said swathboard.

5. The crop guide of claim 1, wherein said first and said second surfaces intersect at an apex along said parting axis.

6. The crop guide of claim 1, wherein the intersection of said first and said second surfaces along said parting axis is rounded.

7. In an agricultural mower having a plurality of counter-rotating rotary disc cutterheads laterally spaced-apart along on a leading edge of the mower for severing a swath of standing crop from the ground and conditioning apparatus for receiving the cut crop and propelling the cut crop material in a rearwardly directed airborne stream of varying lateral density along a trajectory generally adjacent to and below a swathboard, the improvement in a crop guide comprising:

a first generally planar surface arranged on the swathboard to contact a first portion of the airborne stream; and a second generally planar surface arranged on the swathboard to contact a second portion of the airborne stream, said second surface being angled relative to said first surface and intersecting said first surface along a parting axis, said parting axis extending generally in the direction of the crop trajectory from a first point on said lower surface downstream toward a second point spaced apart from said lower surface in the direction of the crop flow, said first surface causing said first portion to be deflected partially laterally from the direction of crop flow in a first direction and said second surface causing said second portion to be deflected partially laterally from the direction of crop flow in a second direction generally opposite to said first direction.

8. The improvement of claim 7, wherein said first and second surfaces are removably connectable to said swathboard.

9. The improvement of claim 8, wherein said swathboard further comprises a plurality of more connections for said crop guide thereby enabling the angle between said first surface and said second surface to be varied.

10. The improvement of claim 7, wherein said first and said second surfaces are integrally formed from said swathboard.

11. The improvement of claim 7, wherein said first and said second surfaces intersect at an apex along said parting axis.

12. The improvement of claim 7, wherein the intersection of said first and said second surfaces along said parting axis is rounded.

13. A method for uniformly distributing a stream of crop material from an agricultural mower, the mower having a plurality of counter-rotating rotary disc cutterheads laterally spaced-apart along a transverse cutterbar for severing a swath of standing crop from the ground and rearwardly discharging one or more concentrated streams of crop material spaced apart along the transverse width of the cutterbar along one or more airborne trajectories, the method comprising the steps of:

providing a generally planar swathboard positioned generally above the airborne trajectories to deflect the trajectories of the crop material by contact with a lower surface;

providing a crop deflector having a first generally planar surface angularly extending from the lower surface and positioned to contact a first portion each crop stream and a second generally planar surface arranged on the swathboard to contact a second portion of each crop stream, the second surface being angled relative to the first surface and intersecting the first surface along a parting axis, the parting axis extending generally in the direction of the airborne trajectory from a first point on the lower surface downstream toward a second point spaced apart from the lower surface in the direction of the airborne crop stream;

operating the mower-conditioner in a manner to sever the standing crop, condition the severed crop, and discharge the one or more airborne crop streams from the conditioner mechanism whereupon the stream interacts with the swathboard;

deflecting by each first surface the first portion partially laterally in a first direction; and deflecting by each second surface the second portion partially laterally in a second direction generally opposite of the first direction whereby the one or more crop streams are dispersed on the ground following the mower in a mat on having a generally uniform density.

14. The method of claim 13, further comprising the steps of:

providing one or more crop deflectors that are removably connectable to the swathboard.

15. The method of claim 14, further comprising the steps of:

providing a plurality of connections for each crop guide to the swathboard; and positioning each crop deflector in one of the plurality of connections of that the angle between the first surface and the second surface is optimized for the crop material.

16. The method of claim 13, wherein the first and the second surfaces are integrally formed from the swathboard.

17. The method of claim 13, wherein the first and the second surfaces intersect at an apex along the parting axis.

18. The method of claim 13 wherein the intersection of said first and said second surfaces along said parting axis is rounded.

\* \* \* \* \*